US009507333B2

United States Patent
Le Pivert

(10) Patent No.: US 9,507,333 B2
(45) Date of Patent: Nov. 29, 2016

(54) METHOD OF PREDICTING THE ENERGY CONSUMPTION OF A BUILDING

(75) Inventor: Xavier Le Pivert, Tresserve (FR)

(73) Assignee: Commissariat a L'energie Atomique et aux Energies Alternatives, Paris (FR)

( * ) Notice: Subject to any disclaimer, the term of this patent is extended or adjusted under 35 U.S.C. 154(b) by 383 days.

(21) Appl. No.: 14/116,682

(22) PCT Filed: May 11, 2012

(86) PCT No.: PCT/EP2012/058837
§ 371 (c)(1),
(2), (4) Date: Nov. 8, 2013

(87) PCT Pub. No.: WO2012/152939
PCT Pub. Date: Nov. 15, 2012

(65) Prior Publication Data
US 2015/0148976 A1    May 28, 2015

(30) Foreign Application Priority Data
May 11, 2011 (FR) ...................................... 11 54057

(51) Int. Cl.
G05B 17/02 (2006.01)
G05F 1/66 (2006.01)
G05B 13/02 (2006.01)
G05B 15/02 (2006.01)

(52) U.S. Cl.
CPC ............ G05B 17/02 (2013.01); G05B 13/027 (2013.01); G05B 15/02 (2013.01); G05F 1/66 (2013.01)

(58) Field of Classification Search
CPC .... G05B 17/02; G05B 13/027; G05B 15/02; G05F 1/66
See application file for complete search history.

(56) References Cited

U.S. PATENT DOCUMENTS

| 7,502,768 B2* | 3/2009 | Ahmed ................... G06N 3/02 706/21 |
| 2004/0117330 A1* | 6/2004 | Ehlers ................. F24F 11/0012 705/412 |
| 2005/0192915 A1* | 9/2005 | Ahmed ................... G06N 3/02 706/21 |
| 2007/0005191 A1* | 1/2007 | Sloup ..................... G05B 17/02 700/276 |
| 2009/0187445 A1 | 7/2009 | Barclay et al. |
| 2009/0234757 A1* | 9/2009 | Tarbell ................... G06Q 30/04 705/30 |

(Continued)

FOREIGN PATENT DOCUMENTS

| CN | 201262704 Y | 6/2009 |
| GB | 2 212 949 A | 8/1989 |
| WO | WO 2007/061357 A | 5/2007 |

OTHER PUBLICATIONS

Notification of the First Office Action issued by SIPO for corresponding Chinese application 201280031332.5 mailed May 19, 2015.

(Continued)

Primary Examiner — Ramesh Patel
(74) Attorney, Agent, or Firm — Frommer Lawrence & Haug LLP

(57) ABSTRACT

Disclosed is a method for forecasting the energy consumption of a building, taking into account the heat exchanges from received solar radiation and/or heat convection and/or conduction between the building and the outside environment based on a physical model. The method includes a learning step to deduce the value of the parameters of the physical model based on previous measurements performed on the building.

17 Claims, 1 Drawing Sheet

(56) References Cited

U.S. PATENT DOCUMENTS

| | | | | |
|---|---|---|---|---|
| 2010/0010939 A1* | 1/2010 | Arfin | ............... | G06Q 10/04 |
| | | | | 705/412 |
| 2010/0185337 A1* | 7/2010 | Le Pivert | ............ | G06Q 10/04 |
| | | | | 700/291 |
| 2010/0235206 A1* | 9/2010 | Miller | ............ | G06Q 10/063 |
| | | | | 705/7.11 |
| 2011/0046792 A1* | 2/2011 | Imes | ............ | F24F 11/0086 |
| | | | | 700/278 |
| 2011/0251726 A1* | 10/2011 | McNulty | ......... | G05B 13/0265 |
| | | | | 700/278 |
| 2013/0073094 A1* | 3/2013 | Knapton | ............ | F24F 11/0034 |
| | | | | 700/278 |

OTHER PUBLICATIONS

Neto, Alberto Hernandez et al.: "Comparison between detailed model simulation and artificial neural network for forecasting building energy consumption", *Energy and Buildings*, 40 (2008), pp. 2169-2176.

Dombayci, Ö Altan: "The prediction of heating energy consumption in a model house by using artificial neural networks in Denizli-Turkey",*Advances in Engineering Software*, 41 (2010), pp. 141-147.

* cited by examiner

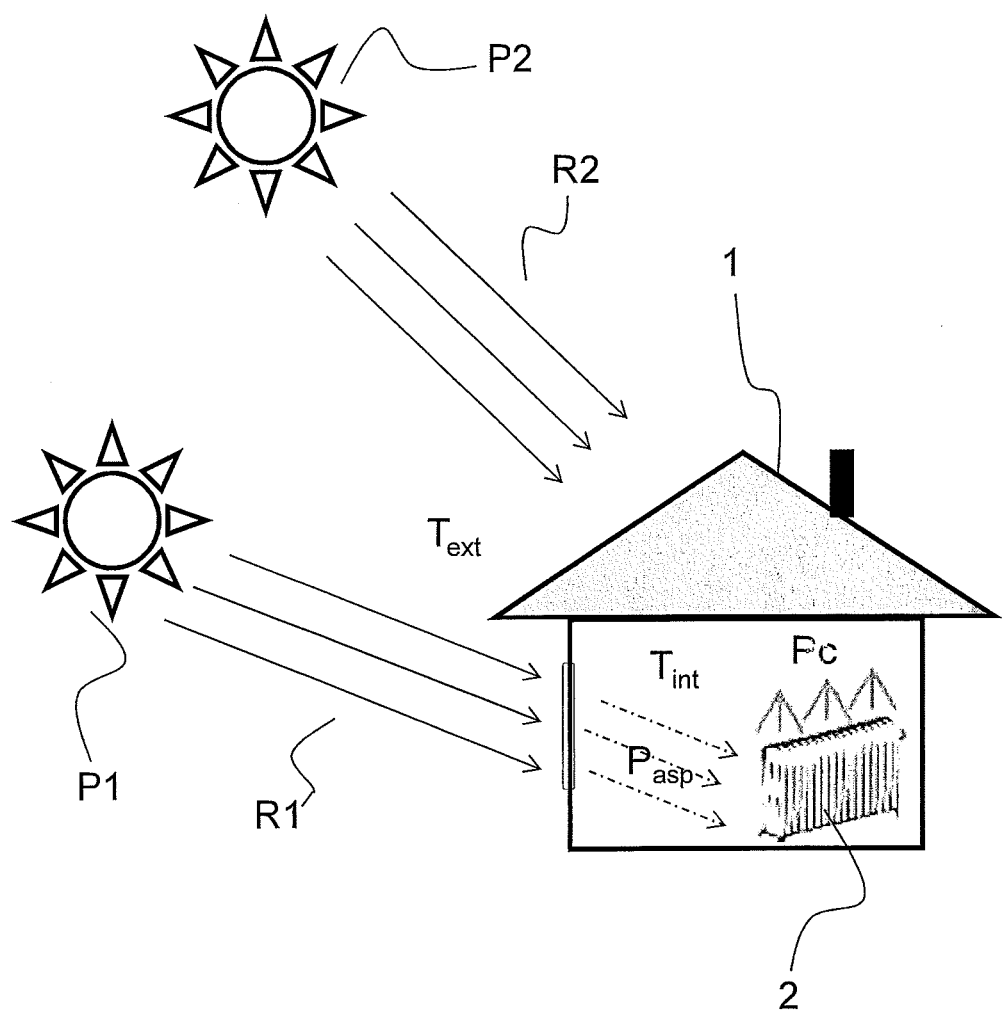

METHOD OF PREDICTING THE ENERGY CONSUMPTION OF A BUILDING

This application is a 371 of PCT/EP2012/058837 filed on May 11, 2012, published on Nov. 15, 2012 under publication number WO 2012/152939, which claims priority benefits from French Patent Application Number 1154057 filed May 11, 2011, the disclosure of which is incorporated herein by reference.

BACKGROUND

1. Field of the Disclosure

The invention relates to a heat management method for a building and a heat system implementing such a method. It also relates to a medium comprising software implementing such a method. Finally, it also relates to a building equipped with such a heat system.

2. Related Art

It is useful to be able to forecast the energy consumption of a building to be able to anticipate the heating or the air-conditioning of the building and achieve, at any moment, the comfort desired by its occupants. However, the heat phenomena which characterize a building are complex and difficult to comprehend.

For this, a first prior art solution relies on an analysis of measured values and data stored over a long period, a year for example. Notably, the energy consumption and internal temperature values of the building are stored as a function of time, together with corresponding meteorological data such as the outside temperature and sunlight. A hybridisation based on a digital processing by a method of neural network type makes it possible to determine a mathematical model representative of these past data, which is then used to produce future forecasts. This method, based on artificial intelligence, requires a large number of data to achieve an acceptable result, which takes a long time to finalize and entails complex computations. Also, since it does not rely on a physical approach to the phenomena, it remains limited and cannot achieve sufficient accuracy in all situations.

A second prior art solution relies on a modelling of the physical phenomena based on strong simplifications so as not to require excessive computation means. In this modelling, the heat exchanges with the outside, of radiation or convection type for example, are disregarded.

In all cases, the results remain unsatisfactory and there is a need for an improved solution for forecasting the energy consumption of a building.

BRIEF SUMMARY

To this end, the invention relies on a method for forecasting the energy consumption of a building, characterized in that it comprises a taking into account the heat exchanges from received solar radiation and/or heat convection and/or conduction between the building and the outside environment based on a physical model implemented by a computer, and in that it comprises a learning step to deduce therefrom the value of the parameters of the physical model based on measurements performed on the building in the past.

More specifically, the invention relates to a method for forecasting the energy consumption of a building, characterized in that it comprises a step of taking into account the heating and cooling of the building by a heating and/or air-conditioning device, passive solar inputs, inputs by internal gains such as the heating by people and household appliances, heat losses such as by heat convection and/or conduction between the building and the outside environment and in that it comprises a learning step to deduce therefrom the value of the parameters of the physical model based on measurements performed on the building in the past, comprising:

- the determination of at least one parameter of the physical model relating to the internal gains and/or to the heat losses based on past measurements during periods of weak sunlight;
- the determination of at least one parameter of the physical model relating to the passive solar inputs based on past measurements during sunny periods.

The invention also relates to a computer medium comprising a computer program implementing the steps of the method for forecasting the energy consumption of a building as described previously.

The invention also relates to a system for forecasting the energy consumption of a building, characterized in that it comprises a control unit which implements the method for forecasting the energy consumption of the building as described previously.

The system for forecasting the energy consumption of a building may comprise a heating and/or air-conditioning device and the control unit may implement the regulation of the internal temperature of the building by actuating the heating and/or air-conditioning device, as a function of a desired setpoint temperature.

The invention also relates to a building, characterized in that it comprises a system for forecasting the energy consumption of a building implementing the method for forecasting the energy consumption of a building as described previously.

The invention is more specifically defined by the claims.

These objects, features and advantages of the present invention will be explained in detail in the following description of a particular embodiment given in a nonlimiting manner in relation to FIG. 1 which schematically illustrates a building and the different energy phenomena taken into account by the method of the invention.

DETAILED DESCRIPTION

The invention relies on taking better account of the heat phenomena external to a building, such as radiation and/or convection and/or conduction. Notably, it makes it possible to take better account of the influences of certain meteorological phenomena such as the wind and passive solar inputs on a building. It is based on a trade-off making it possible to take account of physical phenomena while retaining a simplicity that is compatible with a relatively simple processing by a computer.

According to one embodiment of the invention, the heat balance within a building is expressed as follows:

$$P_c = PT + PV - (P_{asp} + P_i) + S$$

in which:

$P_c$ is the power needed to heat or cool the building,

PT represents the power lost through building defects, such as uninsulated walls resulting in outward heat transmissions, or vice versa, PV represents the power lost through ventilation, $P_{asp}$ represents the power added by the passive solar inputs, $P_i$ represents the power added by the internal gains, such as the heating by the human bodies of people present, by household appliances, etc, S represents the heat flux accumulated in the building.

The power added by the passive solar inputs, which originates mainly from the solar radiation penetrating into a building, becomes less and less negligible as the insulation of the buildings increases. As can be seen the appended figure, these inputs depend on the position of the sun, and therefore the time and seasons, since this radiation reaches the different surfaces of the building at different angles. As an example, the radiation R1 from the sun in position P1 represents the winter situation at a certain time. In summer, the radiation R2 from the sun differs greatly at the same time in that its position P2 is much higher. It then appears that the solar radiation received by the building 1 is very different.

By calculating an energy balance over a period of one day, the previous equation makes it possible to obtain a method for forecasting the energy consumption of a building which considers the following equation (1):

$$\int_{day} P_c + \int_{day} P_{asp} + \int_{day} P_i = \int_{day} (PT + PV) \quad (1)$$

The assumption is made that, over the chosen period, the heat energy of the building linked to the heat inertia is zero, i.e. $\int S=0$, by considering that the average temperature of the building is the same at the start and end of the period. If that is not the case, it is possible, as a variant, to take account of the heat stored or released by the building (heat inertia).

To compute the passive solar inputs, it is considered that the building is a set of a plurality of receiving surfaces, for which a coefficient $A_{req}$ called "equivalent receiving area" is defined, which represents the area of a black body representing the same passive solar input as the receiving surface considered. With this definition, the following formula is obtained for a building with five receiving surfaces:

$$\int_{day} P_{asp} = \sum_{i=1\,to\,5} \int_{day} A_{req,i} \cdot G_i(t) \quad (2)$$

in which $G_i(t)$ represents the irradiance (in $W \cdot m^{-2}$) received by the surface i at the instant t. It is computed on the basis of meteorological data and of geometrical computations taking into account the position of the sun in the sky.

In the embodiment, the physical model of the building considers the building as split up into five receiving surfaces. As a variant, any other number of surfaces can be considered according to the architecture of the building, advantageously between 1 and 10, preferably between 3 and 6, so as to achieve a good trade-off between the complexity of the computations and the accuracy of the model.

The method for forecasting the energy consumption of a building comprises a learning step, which makes it possible to estimate the different parameters $A_{req}$, as will be detailed below.

The heat losses of the building over a day are estimated by the following equation:

$$\int_{day} Heat\_losses = \int_{day} GV \cdot (T_{int} - T_{ext}) = GV \int_{day} \cdot (T_{int} - T_{ext}) \quad (3)$$

in which GV represents a heat loss coefficient (in W/° C.), which makes it possible to make the heat losses depend on the difference in temperature inside $T_{int}$ and outside $T_{ext}$ of the building.

The internal inputs represent the inputs of heat from the devices and people inside the building. They are irregular and depend on the activity within the building. It is considered, for simplicity, that they are repetitive, and take a constant average value for two distinct periods, the days of the week and the weekend, for which the rate of activity in the building differs. As a variant these heat inputs can also depend on the seasons. The average values retained are finally averages measured over these different periods.

As a variant, a number of different profiles can be predefined for these internal inputs, dependent on the occupancy of a building, since simply the presence of people results in a heat input, and/or on the activity within a building, such as the use or not of an oven, more generally of any appliance likely to add heat.

The heating and air-conditioning powers are computed based on the knowledge of the building's different heating and air-conditioning appliances.

A learning method makes it possible to compute the different parameters used in the preceding equations. The equation (1) is expressed as follows, by integrating equations (2) and (3) mentioned previously:

$$\int_{day} P_c(t) + \int P_i(t) + \int_{day} \Sigma_{i=1}^{5} A_{req,i} G_i(t) = \int_{day} GV \cdot (T_{int}(t) - T_{ext}t) \quad (4)$$

The learning will make it possible to compute the parameters on the basis of known past values on the building, by dissociating the periods of weak sunlight and the sunny periods. These periods are defined, for example, by comparing the measured sunlight and the theoretical sunlight in clear weather.

First of all, for the periods of weak sunlight, the passive solar inputs are disregarded and equation (4) can be simplified as follows:

$$\int_{day} P_c(t) + \int_{day} P_i(t) = \int_{day} GV \cdot (T_{int} - T_{ext}) \quad (5)$$

It is assumed that the internal inputs of a day can take two different constant values, the first for the days of the week and the second for the weekend days. The unknowns of equation (5) are therefore GV, $\int_{day1} P_i$ or $\int_{day2} P_i$.

By choosing a few days without sun, for which the other values $P_c$, $T_{int}$, $T_{ext}$ of equation (5) are measured and known, the above three unknowns can be computed, or at the very least estimated.

As a variant, other models can be employed, and, for example, any other type of predefined profiles for the internal inputs. It will then be noted that the learning step can comprise a first learning of the parameters regarding the heat losses during periods of weak sunlight, for which the passive solar inputs are negligible, and of low occupancy, for which the internal gains (or inputs) are negligible. Next, the parameters relating to the internal inputs can be learned during periods of weak sunlight, for which the passive solar inputs are negligible, and of occupancy of the building, for which the internal gains (or inputs) are no longer negligible.

On subsequent use of the physical model, to compute for example the heating needed to achieve a certain temperature setpoint, or to compute a future temperature within the building for a certain heating, as will be detailed hereinbelow, the profile for taking into account the internal inputs will be chosen from profiles predefined as a function of the occupancy of the building and/or of the activity within the building. This choice may be wholly or partly automated, for example on the basis of presence sensors, of activity measurement detectors, for detecting the use of an oven for example.

Then, a few sunny days are considered, for which equation (4) applies. The unknowns of this equation are then the parameters $A_{req,i}$. The values $G_i(t)$ are computed on the basis of measured meteorological data and of geometrical computations including the position of the sun in the sky.

With a few sunny days, enough equations (4) (at least n) are obtained to find all the unknowns $A_{req,i}$.

It should be noted that these parameters thus defined by learning can be refined with additional measurements in time.

When these parameters of equation (4) are known by learning, it is possible to consider the following equation (6), which characterizes the temperature fluctuations within the building:

$$C \cdot \frac{dT_{int}}{dt} = GV(T_{ext}(t) - T_{ext}(t)) + P_c(t) + P_i(t) + \sum_{i=1}^{5} A_{req,i} \cdot G_i(t) \quad (6)$$

in which C represents the heat capacity of the building.

To make use of this equation, a new learning step for estimating the value of the parameter C is implemented.

For a cloudy day, the passive solar inputs are negligible, and at each instant, the following can be written:

$$\hat{C}(t) = \frac{GV(T_{ext}(t) - T_{int}(t)) + P_c(t) + \int_{period} P_i / \text{period}}{\frac{dT_{int}}{dt}} \quad (7)$$

It is then approximated that $P_i(t) = (\int_{day} P_i)/24\,h$, that is to say that the internal input fluctuations over the day are disregarded and their average value is considered to solve the above equation (7). As a variant, it is also possible to determine average profiles of the internal inputs $P_i(t)$ over periods shorter than a day, and to regularly update this measurement to take account of seasonal variations or other variations.

All the other quantities of equation (7) are either measured, or known, from previous learning steps.

C is finally obtained by the average value over the day of the $\hat{C}(t)$ computed previously by equation (7).

C=average$_{day}(\hat{C}(t))$

It should be noted that, for a sunny day, similar computations can be performed but which take account of the passive solar inputs.

The preceding computations therefore form part of a learning step, which makes it possible to determine the parameters of the heat modelling chosen for the building. Then, a method for estimating the future energy consumption of the building can be implemented, in order to be able to ensure the heat comfort of its occupants in the future. In addition, this computation also makes it possible to forecast the energy production requirements over a given territory for an energy production entity, by taking into account all the buildings present on this territory.

To define their comfort requirements, the occupants of the building define an indoor temperature profile that is desired in the future. A temperature regulation system, internal to the building, computes the energy requirement at any instant, more specifically determines the operation of the different internal heating or air-conditioning appliances in order to be able to achieve the setpoint temperature at any instant.

For this, equation (6) mentioned previously, for which all the parameters are now known, is once again used, to deduce therefrom the energy consumption internal to the building at any instant by:

$$P_c(t) = C \cdot \frac{dT_{int}}{dt} - GV(T_{ext}(t) - T_{int}(t)) - P_i(t) - \sum_{i=1}^{5} A_{req,i} \cdot G_i(t)$$

in which $T_{int}(t)$ is the desired internal temperature setpoint, $T_{ext}(t)$ is the outside temperature computed on the basis of weather forecasts, $G_i(t)$ is the irradiance computed on the basis of weather forecasts and geometrical computations including the position of the sun in the sky. It should be noted that when this computation is performed in quasi-real time, or for very short term forecasts, and not for the medium or long term, there is no need for the meteorological data, which can be replaced by simple measured data.

The invention also relates to a system for forecasting the energy requirements of a building, comprising a computer making it possible to implement the method described previously. This system is advantageously linked to the heating and air-conditioning devices of a building to implement its heat regulation, on the basis of the energy consumption profile computed to achieve a comfort desired by its occupants. This system comprises, for example, a control unit comprising the computer which implements the method described previously. This method can be implemented by software means stored on a computer medium.

Finally, a building can be equipped with a system for forecasting the energy consumption of a building implementing the method described previously for the regulation, or more generally the management, of its heating and/or air-conditioning devices.

Thus, the solution retained is a good fit with the objects of the invention and offers the following advantages:

It makes it possible to control the energy consumption and achieve a better heat regulation of a building, with computations that are sufficiently simple but that take into account the most important heat phenomena;

It makes it possible to achieve a high degree of accuracy through the definition of heat parameters specific to each building, during a learning phase.

Finally, the solution described represents an advantageous trade-off between the two solutions of the prior art mentioned previously, since it combines a shrewd physical modelling of a building with the knowledge of past measurements.

The embodiment has been described by taking into account passive solar inputs. As a variant, the passive solar inputs can be modelled by an approach other than that described. Furthermore, according to another variant, the heat convection and/or conduction could also be taken into account, for example to take account of the effect of the wind, particularly if the building is located in a windy region. The same learning principle then makes it possible to define the parameters of the model that represent these physical phenomena.

The invention claimed is:

1. Method for controlling energy consumption of a building, comprising:
forecasting the energy consumption of the building, implemented by a computer and using a physical model taking into account heating and cooling ($P_c$) of the building by a heating or air-conditioning device, passive solar inputs ($P_{asp}$), inputs by internal gains ($P_i$) including heating from body heat of people and household appliances in the building, and heat losses (heat losses) by heat convection or heat conduction between the building and an outside environment, wherein the forecasting comprises
a learning step to deduce therefrom the value of the parameters of a physical model based on previous measurements performed on the building, the learning step comprising:
determining at least one first parameter of the physical model relating to the internal gains and the heat losses based on previous measurements during periods of a first intensity of sunlight;
determining at least one second parameter of the physical model relating to the passive solar inputs based on previous measurements during periods of a second intensity of sunlight, the second intensity being greater than the first intensity; and
estimating the forecast of energy consumption using the physical model using the first and second parameters; and
controlling the heating and air-conditioning devices of the building to implement heat regulation of the building based on the forecasting step.

2. Method for controlling energy consumption of a building according to claim 1, wherein the learning step comprises:
determining at least one parameter of the physical model relating to the heat losses based on previous measurements during periods of first intensity of sunlight and of occupancy of the building by a first number of people; or
determining at least one parameter of the physical model relating to the internal gains based on previous measurements during periods of first intensity of sunlight and of occupancy of the building by the first number of people.

3. Method for controlling energy consumption of a building according to claim 1, wherein the method comprises a using the physical model after the learning step to compute future energy consumption for the heating or for the cooling of a building as a function of a setpoint temperature $T_{int}(t)$.

4. Method for controlling energy consumption of a building according to claim 1, wherein energy received by the passive solar inputs over a given period is computed by the following formula:

$$\int_{period} P_{asp} = \sum_{i=1\,ton} \int_{period} A_{req,i} \cdot G_i(t)$$

in which $P_{asp}$ represents the power of the passive solar inputs, $A_{req,i}$ represents the equivalent receiving area of a surface i of n surfaces of the building, $G_i(t)$ represents an irradiance (in $W.m^{-2}$) received by the surface i at an instant t, computed on the basis of meteorological data or of measurements and of a geometrical computation taking into account a position of the sun in the sky, and wherein the learning step comprises the computation of the different values $A_{req,i}$ by considering the measurements performed on the building in the past during periods of the second intensity of sunlight.

5. Method for controlling energy consumption of a building according to claim 4, wherein the physical model considers n to be between 1 and 10 for the computation of the energy received by the passive solar inputs.

6. Method for controlling energy consumption of a building according to claim 1, wherein the physical model computes an energy balance of the building over a given period by the following equation:

$$\int_{period} Pc + \int_{period} P_{asp} + \int_{period} P_i = \int_{period} (PT + PV)$$

in which:
$P_c$ is power needed to heat or cool the building,
PT represents power lost through outward transmission phenomena,
PV represents power lost through ventilation,
$P_{asp}$ represents the power added by the passive solar inputs,
$P_i$ represents the power added by the internal gains.

7. Method for controlling energy consumption of a building according to claim 6, wherein the method comprises considering that, over a chosen period, the heat energy of the building linked to the heat inertia is zero, i.e. ∫S=0.

8. Method for forecasting the energy consumption of a building according to claim 6, wherein heat losses over a given period of the building are computed by the following equations:

$$\int_{period} \text{Heat\_losses} = \int_{period} PT + PV$$

$$\int_{period} \text{Heat\_losses} = \int_{period} GV \cdot (T_{int} - T_{ext}) = GV \int_{period} \cdot (T_{int} - T_{ext})$$

in which GV represents a heat loss coefficient (in W/° C.), $T_{int}$ an internal temperature of the building and $T_{ext}$ a temperature outside the building.

9. Method for controlling energy consumption of a building according to claim 6, wherein the internal gains are considered to be equal to a constant over the given period, which is an average value of the given period, taking into account the occupancy or activity within the building.

10. Method for controlling energy consumption of a building according to claim 8, wherein the learning step comprises a first substep for determining the parameters GV and $$\int_{period} Pi$$

by considering measurements performed on the building in the past during periods of the first intensity of sunlight and negligible passive solar inputs.

11. Method for controlling energy consumption of a building according to claim 1, wherein temperature fluctuations within a building are taken into account by the following equation:

$$C \cdot \frac{dT_{int}}{dt} = GV(T_{ext}(t) - T_{int}(t)) + P_c(t) + P_i(t) + \sum_{i=1}^{5} A_{req,i} \cdot G_i(t)$$

in which C represents a heat capacity of the building which is estimated during the learning step.

12. Method for controlling energy consumption of a building according to claim 11, wherein the learning step comprises a substep of computing a value of $\hat{C}(t)$ at a given instant of time based on previous measurements performed on the building during a period without sunlight by the following formula:

$$\hat{C}(t) = \frac{GV(T_{ext}(t) - T_{int}(t)) + P_c(t) + \int_{period} Pi/\text{period}}{\frac{dT_{int}}{dt}}$$

and in that C is finally computed by the average of values $\hat{C}(t)$ over the given period of time: C=average$_{day}$($\hat{C}$(t)).

13. Method for controlling energy consumption of a building according to claim 12, wherein the method comprises computing the future energy consumption for the heating or the cooling of a building as a function of a setpoint temperature $T_{int}(t)$ by the following equation:

$$P_c(t) = C \cdot \frac{dT_{int}}{dt} - GV(T_{ext}(t) - T_{int}(t)) - P_i(t) - \sum_{i=1}^{5} A_{req,i} \cdot G_i(t)$$

in which $T_{ext}(t)$ is a outside temperature computed on the basis of weather forecasts or on measurements, $G_i(t)$ represents an irradiance (in W.m$^{-2}$) received by a surface i at the given instant of time t computed on the basis of the weather forecasts or on measurements and on the basis of geometrical computations including a position of the sun in the sky.

14. A non-transient computer-readable medium having stored thereon a computer program that when executed on a processor implements the steps of the method for controlling energy consumption of a building according to claim 1.

15. System for controlling energy consumption of a building, wherein the system comprises a control unit which implements the method for forecasting the energy consumption of the building according to claim 1.

16. System for controlling energy consumption of the building according to claim 15, wherein the system comprises a heating and/or air-conditioning device and in that the control unit implements regulation of an internal temperature of the building by actuating the heating and/or air-conditioning device, as a function of a desired setpoint temperature.

17. A Building, the building comprising a system for controlling energy consumption of the building by implementing the method for forecasting the energy consumption of the building according to claim 1.

* * * * *